United States Patent [19]

Wood et al.

[11] 4,086,171

[45] Apr. 25, 1978

[54] LUBRICATING COMPOSITION HAVING A SELECTIVELY SULFONATED AND HYDROGENATED BLOCK COPOLYMER VISCOSITY-INDEX IMPROVER

[75] Inventors: Donald L. Wood; Robert J. Moore; Robert B. Rhodes, all of Houston, Tex.

[73] Assignee: Shell Oil Company, Houston, Tex.

[21] Appl. No.: 799,901

[22] Filed: May 23, 1977

[51] Int. Cl.$^2$ .................... C10M 1/40; C10M 3/34; C10M 5/22; C10M 7/38
[52] U.S. Cl. .................... 252/33; 252/48.2
[58] Field of Search .................... 252/33, 48.2

[56] References Cited

U.S. PATENT DOCUMENTS

| | | | |
|---|---|---|---|
| 3,574,720 | 4/1971 | DeVault | 252/33 |
| 3,761,458 | 9/1973 | Holler et al. | 252/48.2 |
| 3,769,212 | 10/1973 | Stanton et al. | 252/33 |
| 3,793,203 | 2/1974 | Driscoll et al. | 252/33 |
| 3,972,243 | 8/1976 | Driscoll et al. | 252/48.2 |

*Primary Examiner*—Delbert E. Gantz
*Assistant Examiner*—Irving Vaughn
*Attorney, Agent, or Firm*—Dean F. Vance

[57] ABSTRACT

A lubricating composition having much improved high temperature performance characteristics comprises a major amount of a lubricating oil and a viscosity-index improving amount of a selectively sulfonated and selectively hydrogenated monoalkenyl arene-conjugated diene two block copolymer.

10 Claims, No Drawings

LUBRICATING COMPOSITION HAVING A SELECTIVELY SULFONATED AND HYDROGENATED BLOCK COPOLYMER VISCOSITY-INDEX IMPROVER

BACKGROUND OF THE INVENTION

Mineral lubricating oils have been modified by a vast array of additives for purposes of improving viscosity index, thermal stability, oxidation stability, detergency, and other properties. The viscosity index is highly important especially in multi-grade oils in order to provide lubricating oil compositions having much flatter viscosity-temperature curves than the unmodified oils. It is especially vital that the lubricating oil compositions exhibit a specified range of viscosities at relatively low temperatures. A "multi-grade lubricant" designates those lubricants which meet a 0° F viscosity specification and a 210° F viscosity specification, such as is shown for motor oils by the following table derived from SAE, J300a taken from the SAE Handbook for 1969:

| SAE Oil Grade Specification | Viscosity at 0° F, poises | SAE Oil Grade Specification | Viscosity at 210° F, SUS |
|---|---|---|---|
| — | — | 20 | 45–58 |
| 5W | 12 maximum | 30 | 58–70 |
| 10W | 12–24 | 40 | 70–85 |
| 20W | 24–96 | 50 | 85–110 |

According to the table, for example, an SAE 10W/50 oil must have a viscosity at 0° F between 12 and 24 poises and a viscosity at 210° F of between 85 and 110 SUS.

One particularly useful viscosity-index improver is a selectively hydrogenated styrene-isoprene two block copolymer, such as those disclosed in U.S. Pat. Nos. 3,763,044, and 3,772,196. Lubricants which contain these VI improvers have excellent viscosity indices, as derived from their 100° F and 210° F kinematic viscosities. When the viscosity is plotted against temperature, using charts described in ASTM Standard D341, the relationship is essentially linear from 100° F to 210° F. However, for certain of these selectively hydrogenated styrene-isoprene copolymers, at temperatures approaching 300° F, the lubricant viscosity deviates from linearity and begins to drop. The temperature where this occurs is referred to as the break point temperature ($T_b$). A modified copolymer has now been prepared that gives a more linear temperature-viscosity relationship at temperatures above 210° F and thereby a greater 300° F kinematic viscosity.

SUMMARY OF THE INVENTION

The present invention is a lubricating composition comprising a major proportion of a mineral lubricating oil and between about 0.1 and about 15.0 weight percent of a viscosity index improver having the general configuration A-B wherein each A is a sulfonated monoalkenyl arene polymer block having a number average molecular weight of between about 25,000 and about 55,000, and B is a hydrogenated polymer block, said block B, prior to hydrogenation, being a conjugated diene selected from butadiene, isoprene, and butadiene/isoprene blocks, at least 90 percent of the olefinic unsaturation of block B being reduced by hydrogenation of the block copolymer, said block B having a number average molecular weight between about 20,000 and about 150,000; the weight ratio of block A to block B being between about 0.45:1 and about 0.8:1; and wherein the sulfur content of the block copolymer is more than about 0.1 percent by weight and less than 1.0 percent by weight. Preferably, the viscosity index improver is a selectively hydrogenated, selectively sulfonated styrene-isoprene two block copolymer.

As shown in the following examples, the viscosity index improver of the instant invention results in lubricating oil compositions having unexpectedly improved high temperature (above 270° F) viscosity performance characteristics. As explained more fully in the Illustrative Embodiments, the plot of viscosity versus temperature on ASTM D341 paper for lubricating compositions containing the present selectively sulfonated two block copolymer shows a much more linear relationship as opposed to the presence of a lower breakpoint temperature and non-linear relationship for a non-sulfonated two block copolymer. In addition, the present viscosity index improver also possesses unexpectedly improved detergency characteristics.

The level of sulfonation of the copolymer is critical since too low a level will not result in any improvement in the desired viscosity-temperature relationship, and too high a level will result in the preparation of a polymer that is not oil-soluble.

It has also been found that the molecular weight of the mono-alkenyl arene block is critical in preparing the instant viscosity-index improver. Too low a styrene content at a specified total polymer molecular weight results in reduced thickening efficiency and a lower breakpoint temperature in the non-sulfonated precursor polymer. Sulfonation of such a polymer does not increase thickening efficiency or give a higher breakpoint temperature.

DETAILED DESCRIPTION OF THE INVENTION

The block copolymers employed in the instant invention are selectively sulfonated and selectively hydrogenated two-block copolymers having the general configuration A-B where each A is a monoalkenyl arene polymer and each B prior to hydrogenation, is a polymer of a $C_{4-5}$ conjugated diene. The monoalkenyl arenes which may be used in the preparation of the subject class of block copolymers comprise styrene and methyl styrenes such as alpha-methylstyrene, vinyl toluene and other ring methylated styrenes. Styrene is the preferred monomer. Mixtures of these alkenyl arenes may be used if desired. The B block, prior to hydrogenation, is typically an isoprene polymer block, a butadiene polymer block or an isoprene-butadiene polymer block. When the monomer employed is butadiene, it is preferred that between about 35 and 75 mol percent of the condensed butadiene units in the butadiene polymer block have a 1,2 structure. Thus, when such a block is hydrogenated, the resulting product is, or resembles, a regular copolymer block of ethylene and butene-1 (EB). When the monomer employed is isoprene, it is preferred that at least about 80 mol percent of the isoprene units have a 1,4 structure, which may be either cis or trans. The resulting product is or resembles a regular copolymer block of alternating ethylene and propylene (EP). The preferred monomer is isoprene.

The block copolymers may be prepared by conventional methods using lithium-based initiators, preferably lithium alkyls such as lithium butyls or lithium amyls.

Polymerization is usually conducted in solution in an inert solvent such as cyclohexane or alkanes such as butanes or pentanes and mixtures of the same. The first monomer to be polymerized (which may be either a monoalkenyl arene, butadiene or isoprene) is injected into the system and contacted with the polymerization initiator which is added in an amount calculated to provide the predetermined average molecular weight. Subsequent to obtaining the desired molecular weight and depletion of the monomer, the second monomer is then injected into the living polymer system and block polymerization occurs, resulting in the formulation of the living block copolymer which is then killed, e.g., by the addition of methanol or water.

The average molecular weight of each monoalkenyl arene polymer block in the precursor block copolymer may be from about 25,000 to about 55,000, preferably from about 30,000 to about 45,000. The diene polymer blocks may have average molecular weights between about 20,000 and about 150,000, preferably between about 50,000 and about 120,000. The minimum total molecular weight of the block copolymer should be about 45,000, while the maximum molecular weight should be about 180,000. The weight ratio of A:B is critical and may vary from about 0.45:1 to about 0.8:1.

The precursor block copolymer is selectively hydrogenated under the conditions chosen so that greater than about 90% of the olefin double bonds in the conjugated diene polymer block will be saturated, preferably greater than 95% of the olefin double bonds, and no more than about 20% of the double bonds of the monoalkenyl arene polymer blocks will be hydrogenated. It is important to prepare the block copolymer having the above degree of hydrogenation so that the polymer will have sufficient oxidative stability. Hydrogenation is preferably done by dissolving the precursor block copolymer in an inert solvent, usually the polymerization solvent, adding a cobalt, nickel or iron carboxylate or alkoxide that has been reduced with an aluminum alkyl compound, and pressuring with hydrogen to between 50 psig and 500 psig at mild temperatures of 20° C to 70° C. The selective hydrogenation proceeds to the extent desired in about 0.1 to 1.0 hour. See generally Wald et al, U.S. Pat. No. 3,595,942.

The product from selective hydrogenation may be examined for remaining olefinic unsaturation by infrared spectrometry, by iodine number determination, or by ozone titration in the range of 0.1 to 1.0 meq/gram. It is preferred that infrared absorbances be low at wave lengths of 10.05, 10.35, 10.98 and 13.60 microns and that the iodine number be between 0 and about 100, indicating that at least about 75% of the olefinic double bonds are saturated. The iodine number here refers to the usual method for the analysis of fats, and is reported in units of grams iodine per hundred grams of polymer. The aromatic double bonds do not add iodine in this analytical method, so that only olefinic double bonds are counted. The iodine number of the hydrogenated polymer depends partly on the iodine number of the precursor polymer, that is the ratio of molecular weights of diene polymer block to monoalpha alkenyl arene polymer block, but in the hydrogenated block copolymers of most utility the iodine numbers fall in the range indicated. Similar considerations apply to determination by titration with ozone.

It is not desired, and indeed it is more expensive, to hydrogenate the monoalkenyl arene polymer blocks, as well as the diene polymer blocks. Hydrogenation of the diene polymer block alone produces the saturated aliphatic polymer structure necessary for improved stability. Also, hydrogenation of the monoalkenyl arene polymer blocks requires higher temperatures and pressures than are used to make the selectively hydrogenated block copolymers. Furthermore, the cyclohexane-type rings formed by hydrogenation of the monoalkenyl arene polymer units are more susceptible to attack by oxygen than their unhydrogenated aromatic precursors. For these reasons the selectively hydrogenated block copolymers are more suitable for lubricant additives and less expensive than the fully hydrogenated polymers.

The hydrogenation may not be completely selective and some of the aromatic rings may be hydrogenated under the conditions noted above. Such an event may occur with particular catalysts, or with unusually active samples of a catalyst that is normally very selective. Hydrogenation of up to 20% of the aromatic double bonds in the subject block copolymers may occur. For this reason, hydrogenated block copolymers wherein the diene polymer blocks are more than 90% saturated and the styrene polymer blocks are 0–20% saturated are contemplated and are considered to be within the scope of this invention.

The selective hydrogenation of the conjugated diene polymer blocks is necessary in order to inactivate the conjugated diene polymer block prior to sulfonation. It is desired to selectively sulfonate only the monoalkenyl arene polymer block since this provides greater association of the arene domains for thickening power while the unsulfonated aliphatic domains provide the necessary oil solubility.

The selectively hydrogenated block copolymers obtained as described above are then treated to form the selectively sulfonated products of their metallized or aminated counterparts. The sulfonation reaction, which usually occurs at temperatures in the range from about minus 10° C to about plus 100° C, is usually carried out while the copolymer is swollen by or dispersed in an inert medium such as a haloalkane. Preferred media for this purpose include dichloroethane, dichloromethane, dichloropropane, and the like. It is preferred to carry out the sulfonation in dilute solutions so as to avoid or minimize gellation. Temperatures in the order of 0–70° C are preferred. The sulfonating agent is not highly critical other than to select one which will not cause any material amount of polymer degradation or cross linking. A suitable type comprises the complex of sulfur trioxide with a trialkyl phosphate such as triethyl phosphate dissolved in a halogenated alkane such as 1,2-dichloroethane. Sulfonation also may be carried out in inert substantially saturated hydrocarbons such as alkanes or cycloalkanes including particularly cyclopentane and cyclohexane. See generally, Winkler, U.S. Pat. No. 3,577,357.

The extent of sulfonation is very critical in the performance of the present viscosity index improver. The amount of sulfur present in the block copolymer must be greater than about 0.1 percent by weight (based on the weight of the copolymer) and less than 1.0 percent by weight. At sulfonation levels greater than 1.0 percent, the copolymer no longer is oil-soluble, and will not be a useful viscosity index improver for mineral lubricating oils. Preferred sulfonation levels are from about 0.1 percent by weight sulfur to about 0.5 percent by weight.

Following sulfonation, the polymer is typically coagulated in hot water, pressed to remove water, swollen in a hydrocarbon such as cyclohexane, slurried with water-alcohol and again hot water coagulated.

The sulfonated block polymers may, if desired, be utilized in the free acid form or may be neutralized with alkali and alkaline earth metals such as calcium, sodium, potassium, or lithium or their respective oxides or hydroxides, or may be reacted with an aminating agent such as ammonia or amines. Preferably, the sulfonated block copolymer is neutralized with an alkali and alkaline earth metal hydroxide, such as calcium hydroxide or sodium hydroxide, since the neutralized polymers are more stable than the free acid polymers.

The reaction product of this invention can be incorporated in lubricating oil compositions, e.g., automotive crankcase oils, in concentrations within the range of about 0.1 to about 15, preferably about 0.1 to 5, weight percent based on the weight of the total compositions. The lubricating oils to which the additives of the invention can be added include not only mineral lubricating oils, but synthetic oils also. Synthetic hydrocarbon lubricating oils may also be employed, as well as non-hydrocarbon synthetic oils including dibasic acid esters such as di-2-ethyl hexyl sebacate, carbonate esters, phosphate esters, halogenated hydrocarbons, polysilicones, polyglycols, glycol esters such as $C_{13}$ oxo acid diesters of tetraethylene glycol, etc. Concentrates comprising a minor proportion, e.g., 10 to 45 wt. percent, of said reaction product in a major amount of hydrocarbon diluent, e.g., 95 to 55 wt. percent mineral lubricating oil, with or without other additives present, can also be prepared for ease of handling.

In the above compositions of concentrates and lubricating oils, other conventional additives may also be present, including dyes, pour point depressants, antiwear agents, e.g., tricresyl phosphate, zinc dialkyl dithiophosphates of 3 to 8 carbon atoms, antioxidants such as phenyl-alpha-naphthylamine, tert.octylphenol sulfide, bis-phenols such as 4,4' -methylene bis(3,6-di-tert.butylphenol), viscosity index improvers such as polymethylacrylates, polyisobutylene, alkyl fumarate-vinyl acetate copolymers, and the like as well as other ashless dispersants or detergents such as overbased sulfonates.

The invention is further illustrated by means of the following illustrative embodiments, which are given for the purpose of illustration alone and are not meant to limit the invention to the particular reactants and amounts disclosed.

ILLUSTRATIVE EMBODIMENT

In the Illustrative Embodiment, three different base or precursor polymers were employed. These polymers, identified in Table I, are all selectively hydrogenated styrene-isoprene two block copolymers. Only polymer 1511 has a structure according to the present invention. The styrene content in both other polymers is too low.

TABLE I

| | PRECURSOR COMPOSITION | | | |
|---|---|---|---|---|
| Polymer No. | Styrene Molecular Wt | Isoprene Molecular Wt | Styrene/ Isoprene | meq/gram[a] Unsaturation |
| 1511 | 36,000 | 66,000 | 0.54 | 0.11 |
| TR-70-2615 | 32,000 | 76,000 | 0.42 | 0.04 |
| TR-70-2522 | 20,000 | 88,000 | 0.22 | 0.09 |

[a] Determined by Ozone titration.

The precursor polymer was then sulfonated according to the present invention. The sulfonating reagent was prepared by dissolving 91 grams of triethyl phosphate in 470 grams of 1,2-dichloroethane under a dry nitrogen atmosphere. The solution was then cooled to about 5° C and, with constant stirring of the solution, 80 grams of liquid sulfur trioxide was added slowly by means of a syringe. The final solution was 1 N in active sulfur trioxide.

All the various polymers were sulfonated in a similar manner, the results being shown in Table II. The details on the preparation of polymer number 326-127 are as follows: 15 grams of polymer 1511 were dissolved in 800 milliliters of 1,2-dichloroethane under a dry nitrogen atmosphere. With constant stirring, 40 milliliters of fresh sulfonating agent was slowly added over a period of 10 minutes. The mixture was stirred under nitrogen at room temperature for 48 hours.

The reaction was then quenched with 500 milliliters deionized water and the dichloroethane flash distilled. The water/polymer mixture was refluxed for 2½ hours to hydrolyze any esters present (e.g., ethyl sulfonates). The water phase containing the unreacted acid was then decanted from the polymer and the polymer dissolved in 500 mililiters cyclohexane. (The polymer solution could be washed at this point and the cyclohexane removed to give the free acid sulfonate derivative of the polymer.) Three grams (excess) calcium hydroxide and 500 milliliters deionized water were then added. The mixture was refluxed for 1 hour, water washed to remove excess calcuim hydroxide, and dried to yield 12 to 15 grams of a lightly sulfonated polymer in the form of the calcium salt.

TABLE II

| SULFONATED POLYMER COMPOSITION | | | |
|---|---|---|---|
| Polymer No. | Made From | %w Sulfur | Salt |
| 12799-12-2 | 1511 | 0.38 | Calcium |
| 12799-12 | 1511 | 0.38 | Calcium |
| 326-127 | 1511 | 0.13 | Calcium |
| 461-174A | 1511 | 0.07 | Sodium |
| 461-174B | 1511 | 0.07 | Calcium |
| 461-187-1B | TR-70-2522 | 0.91 | Free Acid |
| 461-187-1 | TR-70-2615 | 0.51 | Calcium |

The sulfonated polymers and precursor polymers were then fully-formulated to an SE quality service station oil, and the lubricating composition subjected to a variety of tests. The results are presented below in Table III. As shown in Table III, the lubricating compositions of the present invention (those containing polymers numbered 12799-12-2, 12799-12, and 326-127) all possessed significantly higher kinematic viscosities at 300° F as compared to the precursor polymer.

TABLE III

| POLYMER VI IMPROVER PERFORMANCE | | | | | | | | |
|---|---|---|---|---|---|---|---|---|
| Polymer No. | %w in Oil[a] | Cold Cranking Simulator, 0° F[b] Centipoise | Viscosity[c] Index | Kinematic Viscosity,[d] Centistokes | | | | |
| | | | | 100° F | 210° F | 240° F | 270° F | 300° F |
| 1511 | 1.70 | 2200 | 179 | 146.8 | 21.2 | 15.1 | 10.8 | 6.7 |

TABLE III-continued
POLYMER VI IMPROVER PERFORMANCE

| Polymer No. | %w in Oil[a] | Cold Cranking Simulator, 0° F[b] Centipoise | Viscosity[c] Index | Kinematic Viscosity,[d] Centistokes | | | | |
|---|---|---|---|---|---|---|---|---|
| | | | | 100° F | 210° F | 240° F | 270° F | 300° F |
| TR-70-2615 | 1.60 | 2050 | 187 | 151.8 | 22.6 | 15.7 | 10.0 | 6.2 |
| TR-70-2522 | 1.70 | 2110 | 103 | 252.7 | 20.5 | 11.6 | 8.5 | 6.7 |
| 12799-12-2 | 1.70 | 1900 | 178 | 171.3 | 23.6 | 16.9 | 12.0 | 7.9 |
| 12799-12 | 1.70 | 2010 | 172 | 136.6 | 20.1 | 13.8 | 10.0 | 7.2 |
| 326-127 | 1.70 | 2050 | — | — | 26.5 | 18.7 | 13.2 | 9.3 |
| 461-174A | 1.70 | 2200 | 174 | 143.6 | 20.3 | 14.3 | 9.8 | 6.3 |
| 461-174B | 1.70 | 2200 | 177 | 137.2 | 19.9 | 14.0 | 9.5 | 6.2 |
| 461-187-1B | 1.70 | 2030 | 115 | 201.7 | 17.6 | 10.6 | 7.8 | 6.3 |
| 461-187-1 | 2.10 | 1900 | 176 | 147.4 | 20.9 | 14.4 | 9.2 | 5.8 |

[a] Lubricant is a fully-formulated SE quality service station oil.
[b] ASTM test method D-2602.
[c] ASTM test method D-2270.
[d] ASTM D-445 test method.

In addition, the VI improvers of the present invention possess unexpectedly improved dispersing characteristics as measured by a Spot Dispersancy Test. In the Spot Dispersancy Test, one part of a 1% weight polymer solution in HVI 100 N oil is mixed with two parts used VC oil and heated overnight at 150° C. Blotter spots are then made on filter paper and the ratio of sludge spot diameter to oil spot diameter is measured after 24 hours. The higher the value, the better the dispersancy. The precursor polymer had a value of only 36.4% whereas the polymer numbered 12799122 had a value of 56.6%.

What is claimed is:

1. A lubricating composition comprising a major proportion of a lubricating oil and between about 0.1 and about 15.0 weight percent of a viscosity index improver having the general configuration A-B wherein:
   a. each A is a sulfonated monoalkenyl arene polymer block having a number average molecular weight of between about 25,000 and about 55,000;
   b. each B is a hydrogenated polymer block, said block B, prior to hydrogenation, being a conjugated diene block selected from the group consisting of butadiene blocks, isoprene blocks, and butadiene/isoprene blocks, at least 90 percent of the olefinic unsaturation of block B being reduced by hydrogenation of the block copolymer, said block B having a number average molecular weight between about 20,000 and about 150,000;
   c. the weight ratio of block A to block B is between about 0.45:1 and about 0.8:1; and
   d. the sulfur content of the block copolymer is more than about 0.1 percent by weight and less than 1.0 percent by weight.

2. The composition of claim 1 wherein each block B prior to hydrogenation is an isoprene block polymer.

3. The composition of claim 1 wherein the monoalkenyl arene is styrene.

4. The composition of claim 1 wherein less than about 20 percent of the aromatic double bonds in block A have been reduced by hydrogenation.

5. A composition according to claim 1 wherein the polymer block A contains sulfonate radicals selected from the group consisting of $-SO_3$ alkaline earth metal, $-SO_3H$, $-SO_3$ alkali metal, $-SO_3 NH_4$, and $SO_3$ amino.

6. A composition according to claim 5 wherein the polymer radical is $-SO_3 Ca$.

7. A composition according to claim 5 wherein the sulfonate radical is $-SO_3 Na$.

8. A composition according to claim 1 wherein the lubricating oil is a mineral lubricating oil.

9. A composition according to claim 1 wherein the sulfur content is between about 0.1 percent by weight and about 0.5 percent by weight.

10. A composition according to claim 1 wherein the molecular weight of the A block is between about 30,000 and about 45,000, and the molecular weight of the B block is between about 50,000 and about 120,000.

* * * * *